United States Patent
Arai et al.

(10) Patent No.: US 8,451,307 B2
(45) Date of Patent: May 28, 2013

(54) OPTICAL SCANNING DEVICE AND IMAGE FORMING APPARATUS

(75) Inventors: Nobuyuki Arai, Kanagawa (JP); Nobuaki Kubo, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 817 days.

(21) Appl. No.: 12/363,891

(22) Filed: Feb. 2, 2009

(65) Prior Publication Data

US 2009/0195636 A1    Aug. 6, 2009

(30) Foreign Application Priority Data

Feb. 5, 2008  (JP) ................................ 2008-024665
Sep. 24, 2008  (JP) ................................ 2008-243516

(51) Int. Cl.
*B41J 15/14*    (2006.01)

(52) U.S. Cl.
USPC .......................................................... 347/243

(58) Field of Classification Search
USPC .......................................................... 347/243
See application file for complete search history.

(56) References Cited

U.S. PATENT DOCUMENTS

| | | | | |
|---|---|---|---|---|
| 3,944,358 A | * | 3/1976 | Bergen | 399/178 |
| 4,732,472 A | * | 3/1988 | Konig et al. | 356/152.3 |
| 4,926,430 A | * | 5/1990 | Isono | 372/33 |
| 5,377,036 A | * | 12/1994 | Appel et al. | 359/216.1 |
| 6,376,837 B1 | | 4/2002 | Itabashi et al. | |
| 6,906,843 B2 | * | 6/2005 | Nagasawa et al. | 359/280 |
| 7,045,773 B2 | * | 5/2006 | Suzuki et al. | 250/234 |
| 7,164,515 B2 | * | 1/2007 | Ito et al. | 359/204.1 |
| 7,301,554 B2 | | 11/2007 | Kubo | |
| 2008/0100895 A1 | | 5/2008 | Hayashi et al. | |
| 2008/0123159 A1 | | 5/2008 | Hayashi et al. | |
| 2008/0204842 A1 | | 8/2008 | Arai et al. | |
| 2008/0219601 A1 | | 9/2008 | Arai et al. | |
| 2008/0267662 A1 | | 10/2008 | Arai et al. | |
| 2008/0285104 A1 | | 11/2008 | Arai et al. | |

FOREIGN PATENT DOCUMENTS

| | | |
|---|---|---|
| JP | 7-113970 | 5/1995 |
| JP | 2006-259574 | 9/2006 |
| JP | 2007-025165 | 2/2007 |

* cited by examiner

*Primary Examiner* — Ryan Lepisto
*Assistant Examiner* — Erin Chiem
(74) *Attorney, Agent, or Firm* — Dickstein Shapiro LLP

(57) ABSTRACT

A pre-deflector optical system includes an isolator arranged on an optical path of a light beam from a light source. The isolator has a first surface with different light transmittances depending on a polarization state of an incident light beam on a first side close to the light source and a second surface imparting an optical phase difference of a ¼ wavelength to the incident light beam on a second side. A deflector deflects the light beam passed through the pre-deflector optical system. A rotation mechanism rotates the isolator around its optical axis. A holding member holds the light source and the isolator in a predetermined positional relationship.

13 Claims, 12 Drawing Sheets

ONE SCANNING PERIOD OF POLYGON MIRROR

ONE SCANNING PERIOD OF POLYGON MIRROR

STRAY LIGHT REFLECTED AT LOWER STAGE

SCANNING LIGHT REFLECTED AT UPPER STAGE

STRAY LIGHT REFLECTED AT UPPER STAGE

SCANNING LIGHT REFLECTED AT LOWER STAGE

OPTICAL SCANNING DEVICE AND IMAGE FORMING APPARATUS

CROSS-REFERENCE TO RELATED APPLICATIONS

The present application claims priority to and incorporates by reference the entire contents of Japanese priority document 2008-24665 filed in Japan on Feb. 5, 2008 and Japanese priority document 2008-243516 filed in Japan on Sep. 24, 2008.

BACKGROUND OF THE INVENTION

1. Field of the Invention

The present invention relates to a technology for scanning a target surface with a light beam.

2. Description of the Related Art

An image forming apparatus employing a laser is widely used in the field of electrophotographic image recording. Such an image forming apparatus typically includes an optical scanning device to form a latent image by rotating a photosensitive drum while scanning a laser beam in the axial direction of the drum using a deflector (e.g., a polygon mirror). In the field of electrophotography, the image forming apparatus needs to provide a high-density image to enhance the image quality and to achieve a fast image output to enhance the throughput.

A method of achieving both the high density and the fast image output includes a so-called multi-beam approach where a scanning is performed simultaneously with a plurality of light beams.

However, if a part of a light beam from a light source is reflected at an optical system and returns to the light source as a stray light, it may affect the optical intensity of the light beam from the light source. Furthermore, it is also possible that the stray light is reflected at the light source and incident on the optical system again, causing a density fluctuation in the image.

In view of these circumstances, an optical scanning device that reduces the stray light returning to the light source has been proposed (e.g., see Japanese Patent Application Laid-open No. 2006-259574, Japanese Patent Application Laid-open No. H7-113970, and Japanese Patent Application Laid-open No. 2007-25165).

In the optical scanning device disclosed in Japanese Patent Application Laid-open No. 2006-259574, however, there is a possibility that the spot sizes on a photosensitive element may vary if a light source having a plurality of light-emitting units is used. Furthermore, problems with the optical scanning devices disclosed in Japanese Patent Application Laid-open No. H7-113970 and Japanese Patent Application Laid-open No. 200725165 are that the cost may increase and the light utilization efficiency may decrease.

SUMMARY OF THE INVENTION

It is an object of the present invention to at least partially solve the problems in the conventional technology.

According to one aspect of the present invention, there is provided an optical scanning device that scans at least one scanning surface with a light beam. The optical scanning device includes a light source having a plurality of light-emitting units; a pre-deflector optical system including an isolator that is arranged on an optical path of a light beam from the light source, which has a first surface with different light transmittances depending on a polarization state of an incident light beam on its first side close to the light source and a second surface imparting an optical phase difference of a quarter wavelength to the incident light beam on its second side opposite to the first side along the optical path; a deflector that deflects the light beam passed through the pre-deflector optical system; a rotation mechanism that rotates the isolator around an optical axis of the isolator; and a holding member that holds the light source and the isolator in a predetermined positional relationship.

Furthermore, according to another aspect of the present invention, there is provided an image forming apparatus including at least one image carrier; and an optical scanning device that scans the at least one image carrier with a light beam modulated by image information. The optical scanning device includes a light source having a plurality of light-emitting units, a pre-deflector optical system including an isolator that is arranged on an optical path of a light beam from the light source, which has a first surface with different light transmittances depending on a polarization state of an incident light beam on its first side close to the light source and a second surface imparting an optical phase difference of a quarter wavelength to the incident light beam on its second side opposite to the first side along the optical path, a deflector that deflects the light beam passed through the pre-deflector optical system, a rotation mechanism that rotates the isolator around an optical axis of the isolator, and a holding member that holds the light source and the isolator in a predetermined positional relationship.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
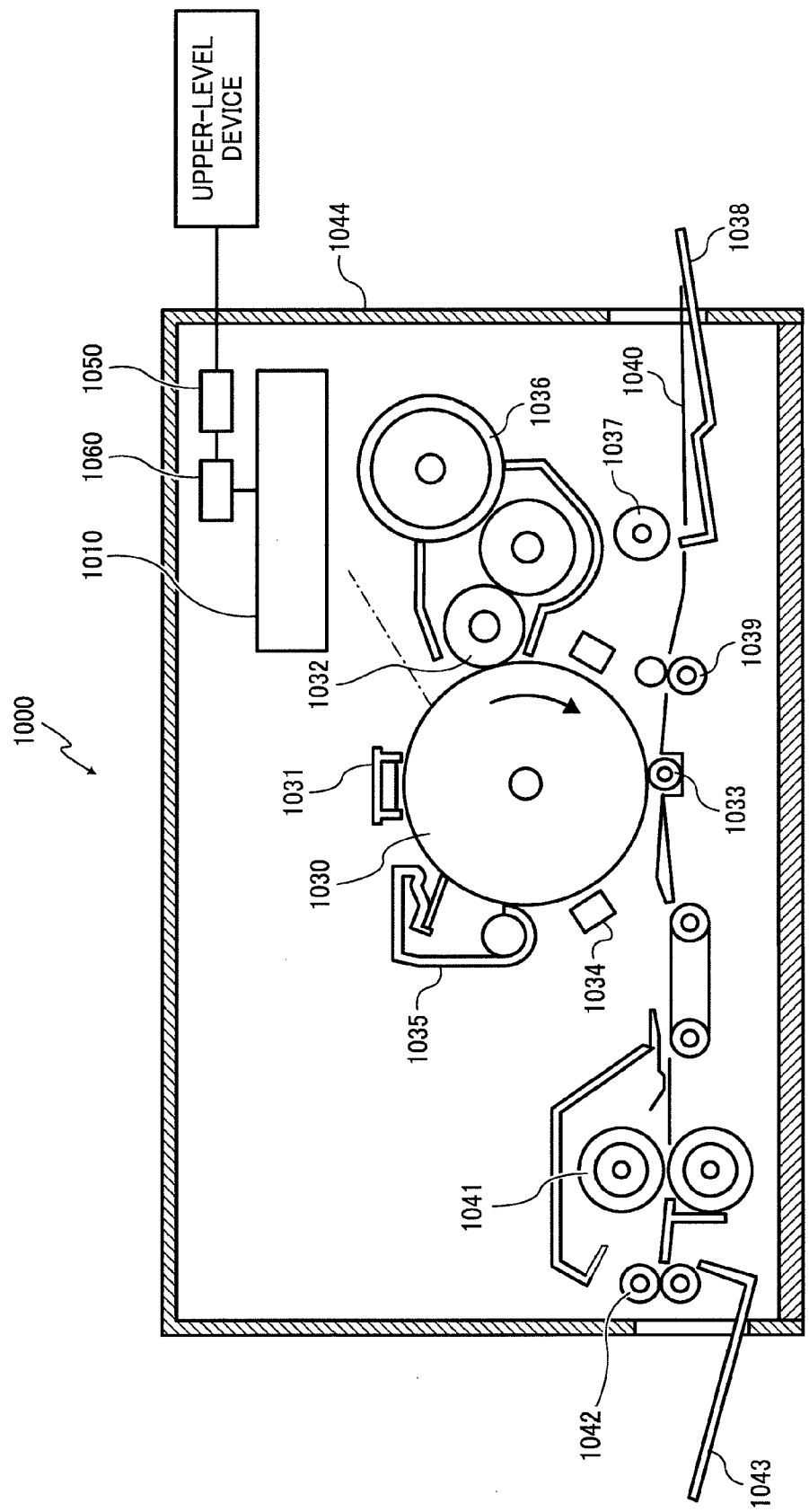
FIG. 1 is a schematic diagram of a laser printer as an image forming apparatus according to the present invention.

FIG. 1 is a schematic diagram of a laser printer 1000 as an image forming apparatus according to the present invention.

The laser printer 1000 includes an optical scanning device 1010 according to a first embodiment of the present invention, a photosensitive drum 1030, a charging unit 1031, a developing roller 1032, a transfer charging unit 1033, a neutralizing unit 1034, a cleaning unit 1035, a toner cartridge 1036, a feed roller 1037, a feed tray 1038, a pair of registration rollers 1039, a fixing roller 1041, a discharge roller 1042, a discharge tray 1043, a communication control unit 1050, a printer control unit 1060 that controls each of the components, and so forth. These components are arranged at predetermined positions in a printer casing 1044.

The communication control unit 1050 controls a bi-directional communication with an upper-level device (e.g., a personal computer (PC)) via a network.

The photosensitive drum 1030 is a cylindrical member having a photosensitive layer formed on the surface thereof. The surface of the photosensitive drum 1030 is a scanning surface to be scanned. The photosensitive drum 1030 rotates in the direction indicated by the arrow shown in FIG. 1.

The charging unit 1031, the developing roller 1032, the transfer charging unit 1033, the neutralizing unit 1034, and the cleaning unit 1035 are arranged near the surface of the photosensitive drum 1030. More specifically, they are arranged in following order along the rotational direction of the photosensitive drum 1030: the charging unit 1031→the developing roller 1032→the transfer charging unit 1033→the neutralizing unit 1034→the cleaning unit 1035.

The charging unit 1031 uniformly charges the surface of the photosensitive drum 1030.

The optical scanning device 1010 irradiates the surface of the photosensitive drum 1030 charged by the charging unit 1031 with a light beam modulated based on image information from the upper-level device. By doing so, a latent image corresponding to the image information is formed on the surface of the photosensitive drum 1030. The formed latent image moves towards the developing roller 1032 along with the rotation of the photosensitive drum 1030.

Toner stored in the toner cartridge 1036 is supplied to the developing roller 1032.

The developing roller 1032 applies the toner supplied from the toner cartridge 1036 onto the latent image formed on the surface of the photosensitive drum 1030 to make the image information a visual image. The latent image having the toner applied thereon (hereinafter, also referred to as "a toner image" for the sake of convenience) moves towards the transfer charging unit 1033 along with the rotation of the photosensitive drum 1030.

Recording sheets 1040 are stored in the feed tray 1038. Near the feed tray 1038 is the feed roller 1037, which takes the recording sheets 1040 out of the feed tray 1038 one at a time and transports the recording sheet 1040 to the registration rollers 1039. The registration rollers 1039 temporarily holds the recording sheet 1040 taken out by the feed roller 1037 and feeds the recording sheet 1040 to between the photosensitive drum 1030 and the transfer charging unit 1033 along with the rotation of the photosensitive drum 1030.

A voltage of opposite polarity to that of the toner is applied to the transfer charging unit 1033 to electrically transfer the toner on the surface of the photosensitive drum 1030 onto the recording sheet 1040. With this voltage, the toner image on the surface of the photosensitive drum 1030 is transferred to the recording sheet 1040. The recording sheet 1040 with the transferred toner is sent to the fixing roller 1041.

The fixing roller 1041 applies heat and pressure to the recording sheet 1040, thereby causing the toner to be fixed on the recording sheet 1040. The recording sheets 1040 on which toner has been fixed in this manner are sent to the discharge tray 1043 via the discharge roller 1042 and are stacked on the discharge tray 1043 sequentially.

The neutralizing unit 1034 neutralizes the surface of the photosensitive drum 1030.

The cleaning unit 1035 removes any toner (residual toner) remaining on the surface of the photosensitive drum 1030 after transferring the toner image. The surface of the photosensitive drum 1030 from which the residual toner has been removed returns to a position facing the charging unit 1031.

Figure 2:
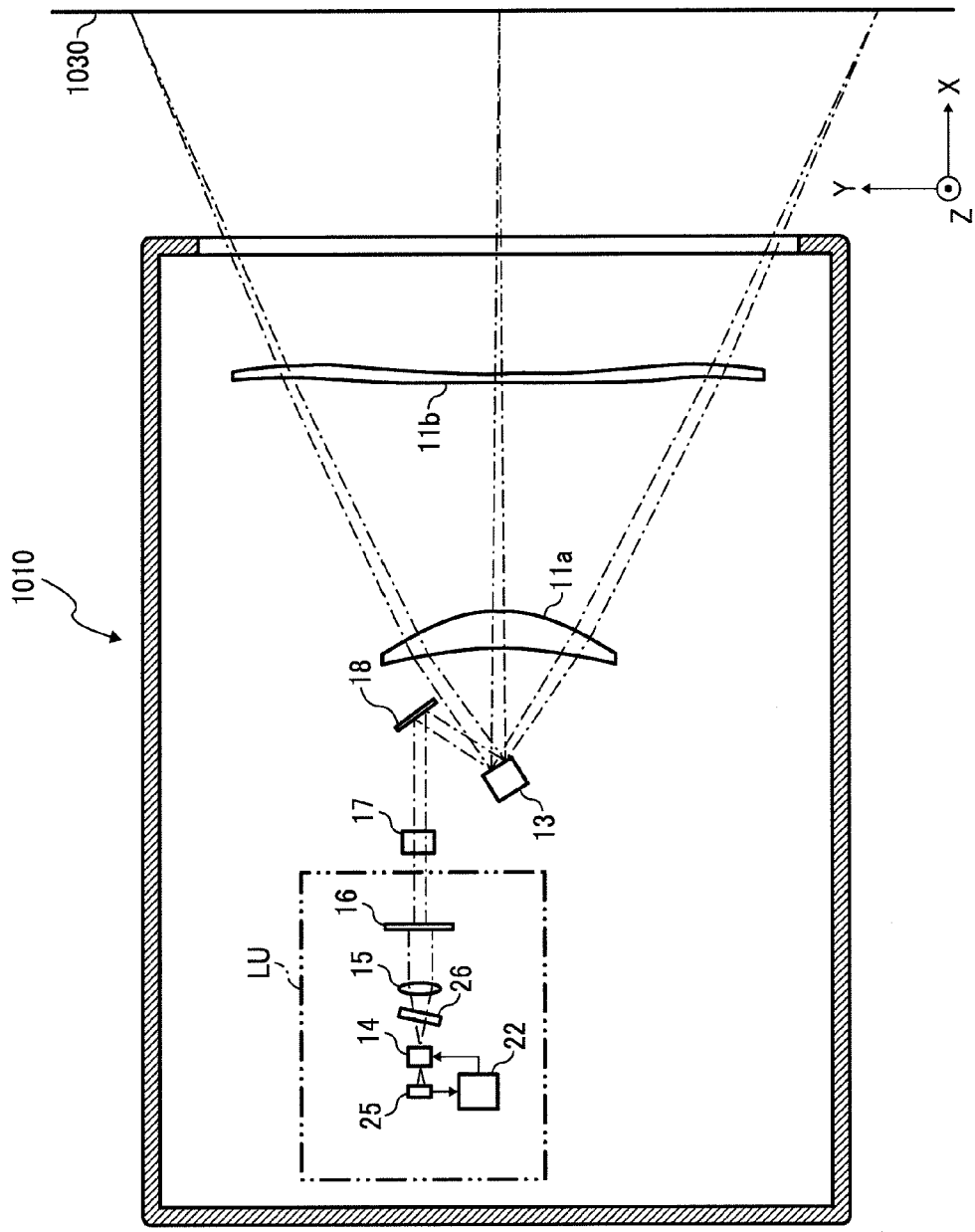
FIG. 2 is a schematic diagram of an optical scanning device according to a first embodiment of the present invention.

As shown in FIG. 2, the optical scanning device 1010 includes, for example, a light-source unit LU, a deflector-side scanning lens 11a, an image-side scanning lens 11b, a polygon mirror 13, a cylindrical lens 17, and a reflecting mirror 18. The present specification assumes that the direction along the longitudinal direction of the photosensitive drum 1030 is the Y-axis direction and the direction along the optical axis of the scanning lenses (11a and 11b) is the X-axis direction in the XYZ three-dimensional Cartesian coordinate system.

Hereinafter, the direction corresponding to the main-scanning direction is referred to as "a direction corresponding to the main scanning" and the direction corresponding to the sub-scanning direction is referred to as "a direction corresponding to the sub-scanning" for the sake of convenience.

Figure 3:
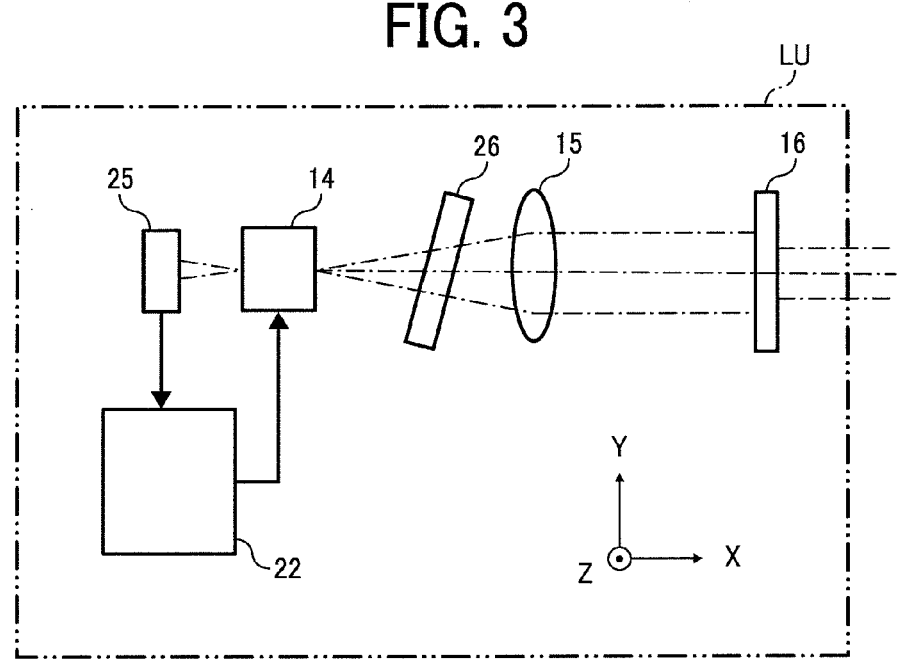
FIG. 3 is a schematic diagram of a light-source unit shown in FIG. 2.

As shown in FIG. 3, the light-source unit LU includes a light source 14, a coupling lens 15, an aperture plate 16, a light-source driving unit 22, a photoreceiver 25, and an isolator 26.

Figure 4:
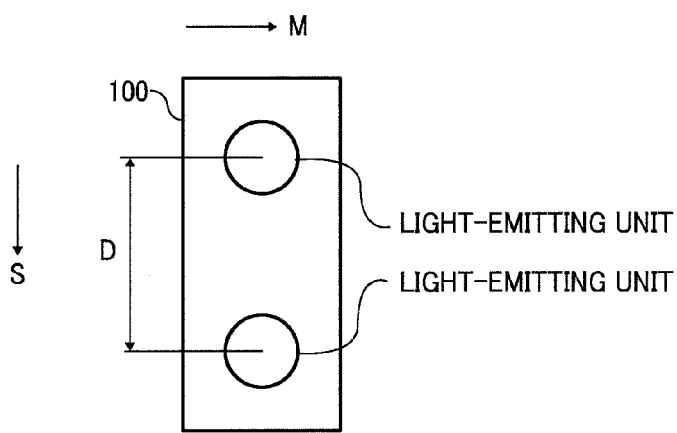
FIG. 4 is a schematic diagram of a laser array of a light source shown in FIG. 3.

The light source 14 includes, as shown in FIG. 4, a laser array 100 having two light-emitting units. The direction M shown in FIG. 4 is the direction corresponding to the main scanning (the Y-axis direction in the present embodiment), and the direction S is the direction corresponding to the sub-scanning (the Z-axis direction in the present embodiment).

The distance D between the two light-emitting units along the direction S is 30 micrometers. In the present specification, "the distance between the light-emitting units" refers to the center-to-center distance between the two light-emitting units.

Each of the light-emitting units is an edge-emitting semiconductor laser with an oscillation wavelength of 655 nanometers. A light beam is emitted both in the +X direction and the −X direction from each of the light-emitting units. In the design, a light beam emitted from each of the light-emitting units is assumed to be linearly polarized (p-polarized in the present embodiment).

Figure 5:
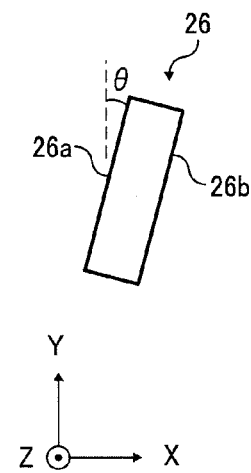
FIG. 5 is a schematic diagram of an isolator shown in FIG. 4.

The isolator 26 is arranged at the +X side of the light source 14. As shown in FIG. 5, the isolator 26 has a first surface 26a on one side thereof (the −X side in the present embodiment) adjacent to the light source 14 and a second surface 26b on the other side thereof (the +X side in the present embodiment). The first surface 26a has different light transmittances depending on the polarization state of the incident light beam. The second surface 26b imparts an optical phase difference of ¼ wavelength to the incident light beam. In the first embodiment, the effective size of each surface is 4 millimeters in the direction corresponding to the main scanning and 1.5 millimeters in the direction corresponding to the sub-scanning.

The isolator 26 is arranged such that the first surface 26a and the second surface 26b are tilted with respect to an imaginary plane perpendicular to the principal ray direction of the light beam from the light source 14. In the first embodiment, the tilt angle θ is set to 5° (see FIG. 5). This can prevent the light reflected at the isolator 26 from returning to the light source 14. The tilt angle and the tilt direction are not limited to those described in the first embodiment.

Figure 6:
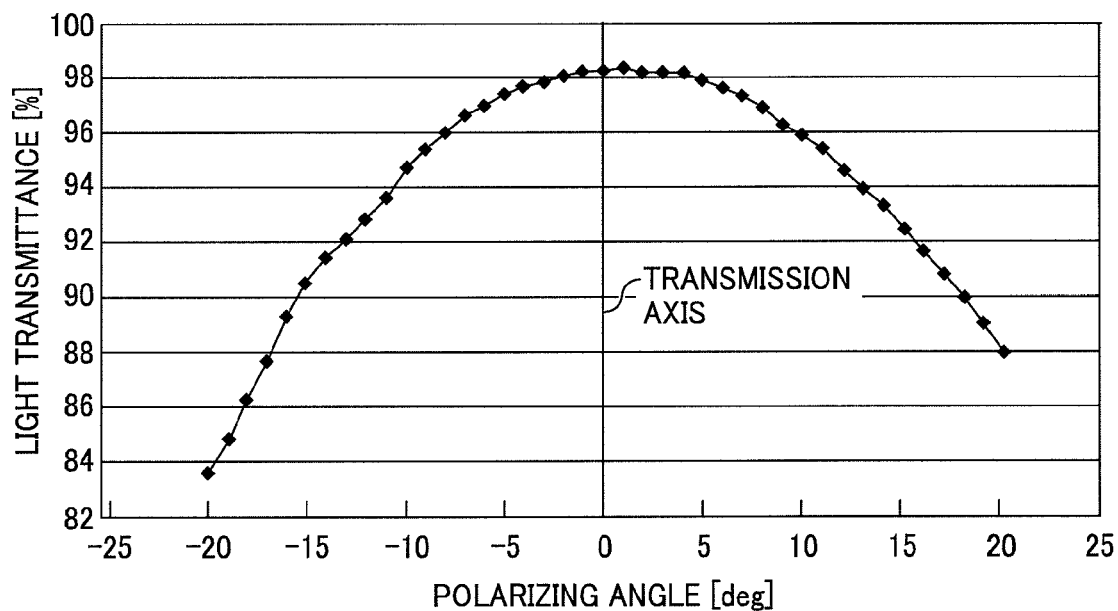
FIG. 6 is a graph for explaining a polarizing filter function of the isolator.

The relationship between the polarizing angle of the incident light relative to the transmission axis and the light transmittance at the first surface 26a is shown in FIG. 6.

Figure 7:
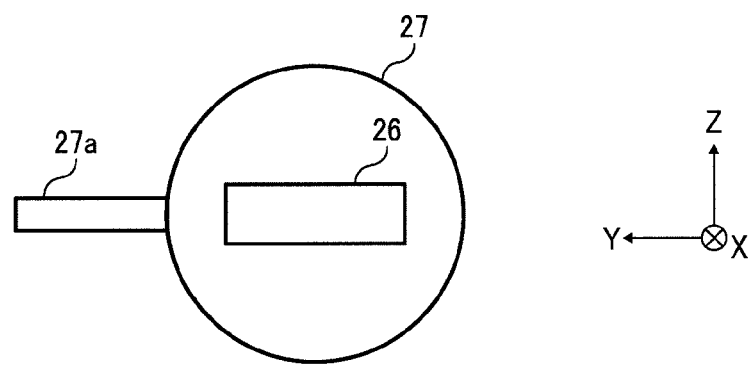
FIG. 7 is a schematic diagram of a cell that accommodates the isolator.

In the first embodiment, the isolator 26 is arranged, for example, in a cylindrical cell 27 with a radius of 3 millimeters such that the center of the isolator 26 coincides with the center of the cell 27, as shown in FIG. 7. Furthermore, the cell 27 is provided with a bar 27a that is a rod-shaped member.

Figure 8A:
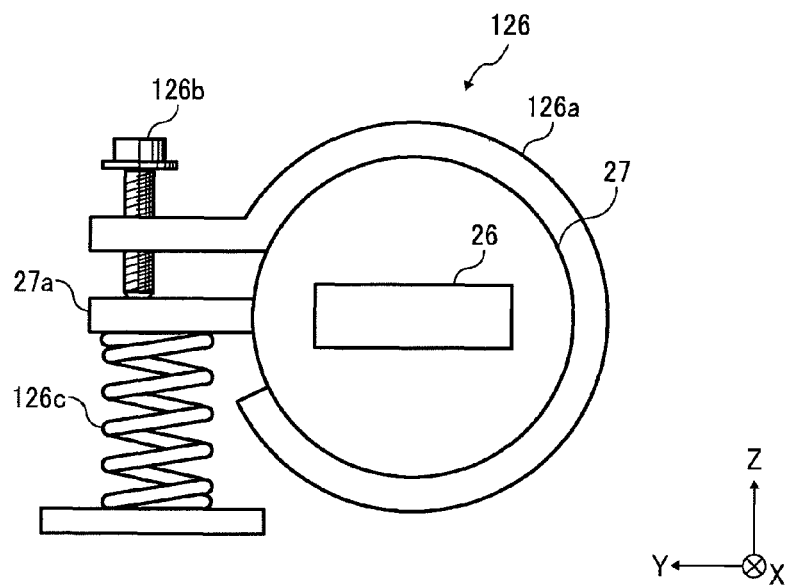
FIGS. 8A and 8B are schematic diagrams of a holding member that supports the cell shown in FIG. 7.
Figure 8B:
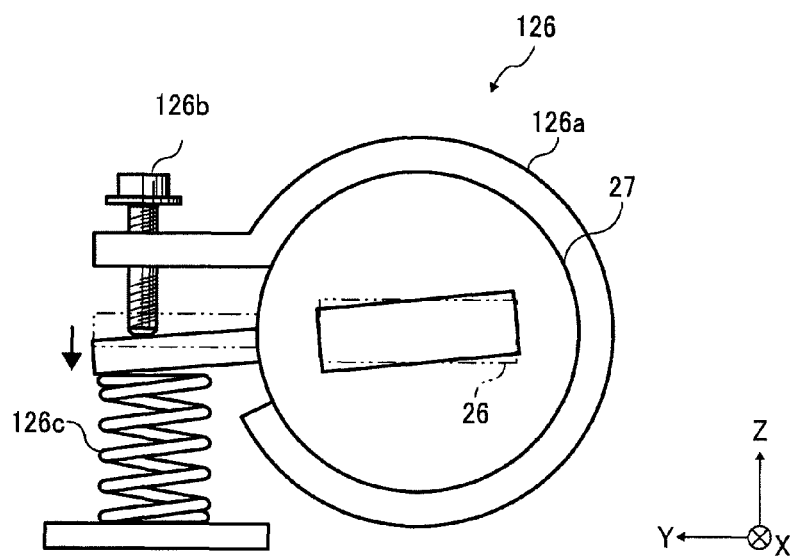

As shown in FIGS. 8A and 8B, the cell 27 is held on, for example, a holding unit 126 having a holding member 126a, a screw 126b, and a spring 126c.

The holding member 126a is a tubular member having a slit extending in its longitudinal direction and a flange. The inner diameter of the holding member 126a is slightly larger than the outer diameter of the cell 27. The cell 27 is accommodated in the holding member 126a such that the bar 27a protrudes from the slit.

The flange is arranged at the +Z side of the bar 27a and has a screw hole formed thereon that extends in the Z-axis direction. The screw 126b is screwed into this screw hole from the +Z side. The tip of the screw 126b is in contact with the surface of the bar 27a.

The bar 27a is biased in the +Z direction by the spring 126c.

The cell 27 and the isolator 26 can be rotated about an axis that passes through the center thereof and that is parallel to the X axis by turning the screw 126b.

In the first embodiment, the optical intensity of the light beam emitted from the light source 14 passing through the isolator 26 is measured while turning the screw 126b, and the turning of the screw 126b is stopped at a position where the measured value is maximized. In other words, the isolator 26 is adjusted such that the light beam emitted from the light source 14 exhibits the maximum light transmittance.

Typically, a light from a light source shows a variation in polarizing angle due to assembly errors and individual differences of the light source. For example, if the variation of polarizing angle due to individual differences among light sources has a range of ±10° and the variation of polarizing angle due to installation errors has a range of ±5°, then the variation of polarizing angle of the light incident on the isolator 26 has a maximum range of ±15°. If light with a polarizing angle of −15° relative to the transmission axis of the first surface 26a is incident on the isolator 26, then the light transmittance is about 91% (see FIG. 5). In the first embodiment, because the holding unit 126 of the cell 27 has a rotation mechanism that rotates the cell 27 about the optical axis of the isolator 26, the transmission axis direction of the first surface 26a can be made to coincide with the polarization direction of the light from the light source. In this case, the light transmittance is about 98% (see FIG. 5). In other words, a loss of the optical intensity of the light beam can be reduced.

Figure 9A:
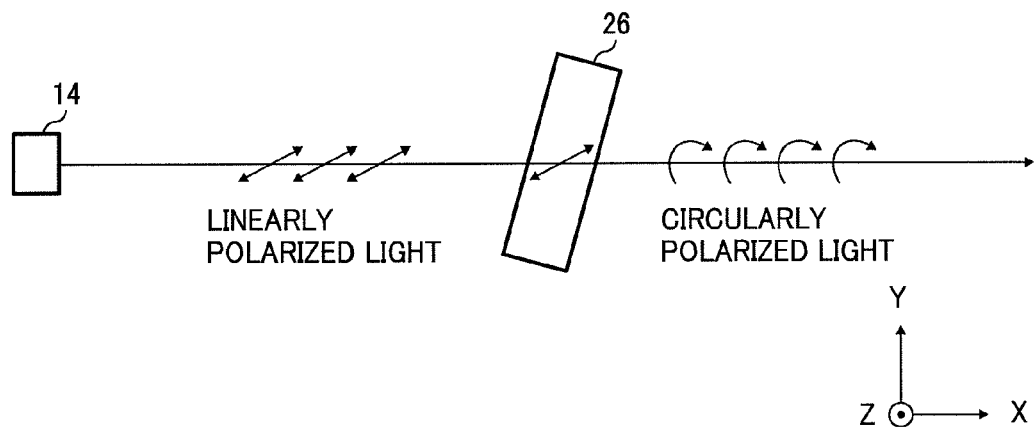
FIGS. 9A and 9B are schematic diagrams for explaining an operation of the isolator.
Figure 9B:
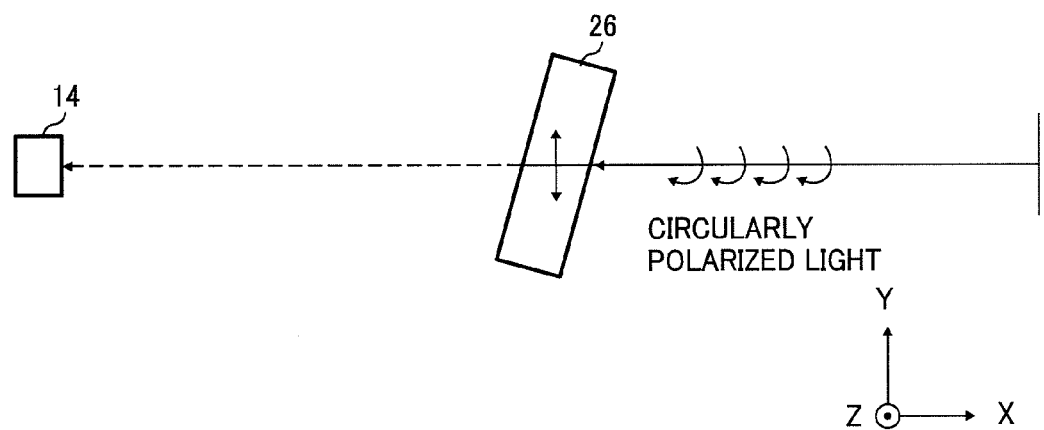

Consequently, the light beam from the light source 14 passes through the first surface 26a with a light transmittance of more than 98% and is converted into circularly polarized light at the second surface 26b (see FIG. 9A). The light beam reflected, for example, at the polygon mirror 13 is converted into circularly polarized light of opposite direction to the polarization state of the incident light and is then incident on the second surface 26b, where the circularly polarized light is converted into an s-polarized light and blocked by the first surface 26a (see FIG. 9B). Thus, it is possible to suppress the stray light returning to the light source 14.

Referring back to FIG. 2, the coupling lens 15 substantially collimates the light beam that has passed through the isolator 26. In the first embodiment, the focal length of the coupling lens 15 is 27 millimeters.

The light source 14 and the coupling lens 15 are held together with the isolator 26 on the holding unit 126 with a predetermined positional relationship between them.

The aperture plate 16 has an aperture portion that shapes the light beam that has passed through the coupling lens 15. In the first embodiment, the aperture portion has a length of 5.35 millimeters in the direction corresponding to the main scanning and a length of 2.1 millimeters in the direction corresponding to the sub-scanning. The light beam that has passed through the aperture portion is output from the light-source unit LU.

The cylindrical lens 17 focuses the light beam from the light-source unit LU, via the reflecting mirror 18, near the deflecting reflection surface of the polygon mirror 13 in the direction corresponding to the sub-scanning. In the first embodiment, the focal length of the cylindrical lens 17 is 110 millimeters.

The optical system on the optical path between the light source 14 and the polygon mirror 13 is also called a pre-deflector optical system. In the first embodiment, the pre-deflector optical system includes the isolator 26, the coupling lens 15, the aperture plate 16, the cylindrical lens 17, and the reflecting mirror 18.

The polygon mirror 13 includes, for example, tetrahedral mirrors whose inscribed circle has a radius of 7 millimeters, and the mirrors function as deflecting reflection surfaces. The polygon mirror 13 deflects the light beam from the reflecting mirror 18 while rotating at a constant speed about an axis parallel to the direction corresponding to the sub-scanning direction.

The deflector-side scanning lens 11a is arranged on the optical path of the light beam deflected by the polygon mirror 13.

The image-side scanning lens 11b is arranged on the optical path of the light beam that has passed through the deflector-side scanning lens 11a. The surface of the photosensitive drum 1030 is irradiated with the light beam that has passed through the image-side scanning lens 11b to form a light spot. This light spot moves in the longitudinal direction of the photosensitive drum 1030 along with the rotation of the polygon mirror 13 so that the photosensitive drum 1030 is scanned. The moving direction of the light spot corresponds to the "main-scanning direction". On the other hand, the rotational direction of the photosensitive drum 1030 corresponds to the "sub-scanning direction".

The optical system arranged on the optical path between the polygon mirror 13 and the photosensitive drum 1030 is also called a scanning optical system. In the first embodiment, the scanning optical system includes the deflector-side scanning lens 11a and the image-side scanning lens 11b. At least one reflecting mirror may be arranged on at least one of the optical path between the deflector-side scanning lens 11a and the image-side scanning lens 11b and the optical path between the image-side scanning lens 11b and the photosensitive drum 1030.

The photoreceiver 25 is arranged at the −X side of the light source 14 and receives the light beam emitted from the laser array 100 in the −X direction. The photoreceiver 25 outputs a signal (optical-to-electrical conversion signal) according to the amount of received light to the light-source driving unit 22.

The light-source driving unit 22 supplies a driving current to each of the light-emitting units of the laser array 100 and performs an automatic power control (APC) based on the output signal of the photoreceiver 25.

For the edge-emitting semiconductor lasers, the light emitted backward is monitored, and a driving current is controlled to provide a predetermined output based on the amount of light detected in the monitoring. In the conventional technology, a part of the light emitted from the light source is reflected at a coupling lens, a cylindrical lens, or a polygon mirror and returned to the light source in some cases. If this occurs, the optical intensity of the light beam emitted from the light source fluctuates even with the APC because the light incident on a light-receiving element for detecting the optical intensity of the light beam includes such a return light, possibly causing nonuniform density in the output image. On the other hand, according to the first embodiment, because the return light is blocked by the isolator, an accurate optical intensity can be monitored, thus preventing the nonuniform density in the output image.

As described above, the optical scanning device 1010 according to the first embodiment includes the light source 14 having a plurality of light-emitting units; the isolator 26 that is arranged on the optical path of the light beam from the light source 14 and that has, on one side thereof adjacent to the light source 14, the first surface 26a having different light transmittances depending on the polarization state of the incident light beam and has, on the other side thereof, the second surface 26b that imparts an optical phase difference of ¼ wavelength to the incident light beam; and the holding unit 126 that allows the isolator 26 to rotate about the optical axis thereof.

In this case, even if the polarization states of the light-emitting units of the light source 14 are varied, the light transmittance of the light beam from the light source can be maximized by rotating the isolator 26. As a result, the surface of the photosensitive drum 1030 can be irradiated with the light beam from the light source 14 with a reduced optical loss.

Even if the light beam output from the light-source unit LU is reflected, for example, at the polygon mirror 13 and returns towards the light-source unit LU, most of the return light beam is blocked by the first surface 26a because the polarizing angles of the emitted light beam and the return light beam differ from each other by 90° at the first surface 26a.

In short, the stray light entering the light source 14 can be reduced without increasing costs or decreasing the optical intensity of the light beam output from the light-source unit.

Therefore, a high-accuracy optical scanning can be performed without increasing costs or decreasing the light utilization efficiency.

Furthermore, according to the first embodiment, because the isolator 26 has a polarizing filter function and a phase-difference imparting function, the number of components and the number of assembly processes can be reduced compared with a case where a polarizing plate and a wave plate are used. In addition, the adjustment process can be simplified.

Furthermore, because the positional relationship between the light source 14 and the isolator 26 is defined accurately by positioning them in a unit, it is not necessary to enlarge the effective area of the isolator 26 to allow for the impact of assembly errors or the component tolerance between the light source 14 and the isolator 26. In addition, because the isolator 26 is arranged between the light source 14 and the coupling lens 15, the effective area of the isolator 26 can be reduced. Furthermore, because the longitudinal direction of the effective area of the isolator 26 substantially coincides with the longitudinal direction of the aperture portion, the effective area of the isolator 26 can be reduced. In short, the size of the isolator 26 can be minimized, which suppresses an increase of the costs.

In addition, because the adjustment of the coupling lens 15 and the rotational adjustment of the isolator 26 about the optical axis can be performed on the unit, it is possible to assure the optical characteristics as a whole unit. For a light source having a plurality of light-emitting units, the light source needs to be rotated about the optical axis relative to a housing to adjust the distance between image-forming points (sub-scanning beam pitch) on the surface of the photosensitive drum. Also in this regard, the positional relationship between the housing and the light-source unit can be defined with high accuracy, and the light source can be adjusted about the optical axis with high accuracy by making the light source a single unit. If a light source is press-fitted directly with the housing, instead of forming the light-source unit, then the rotation axis for adjustment about the optical axis may be shifted due to variations in the shape of the light source package. If this occurs, optical characteristics, such as the spot size and the pitch of the light beam, may degrade.

Furthermore, because the isolator 26 is accommodated in the cylindrical cell, the isolator 26 can be rotated accurately with a simple mechanism.

In addition, because each surface of the isolator 26 is tilted with respect to an imaginary plane perpendicular to the principal ray direction of the light beam from the light source 14, the light beam reflected at the isolator 26 can be prevented from returning to the light source 14.

Furthermore, because the stray light entering the light source 14 is reduced, the stray light entering the photoreceiver 25 is also reduced. This allows the APC to be performed with high accuracy based on an output signal from the photoreceiver 25.

In addition, because the laser printer 1000 includes the optical scanning device 1010, a high-quality image can be formed at high speed without causing an increase of the costs.

Although the first embodiment has been described assuming that the laser array 100 is provided with two light-emitting units, the number of light-emitting units is not limited to any particular number.

Figure 10:
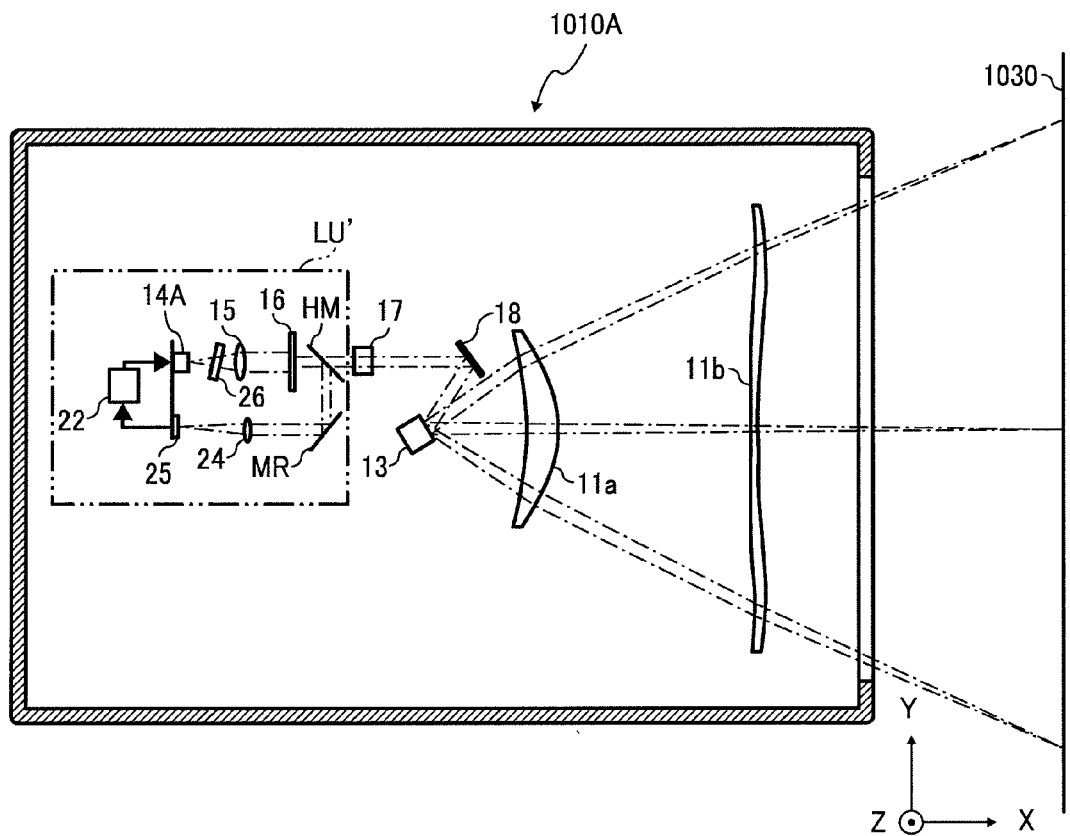
FIG. 10 is a schematic diagram of an optical scanning device according to a second embodiment of the present invention.

FIG. 10 is a schematic diagram of an optical scanning device 1010A according to a second embodiment of the present invention. The optical scanning device 1010A includes a light-source unit LU' in place of the light-source unit LU used in the optical scanning device 1010 according to the first embodiment. The other structures of the optical scanning device 1010A are the same as those of the optical scanning device 1010 described in the first embodiment. For this reason, the following description focuses only on differences from the first embodiment. Components that are the same as or similar to those in the first embodiment are denoted by the same reference numerals, and a description thereof will be simplified or omitted.

Figure 11:
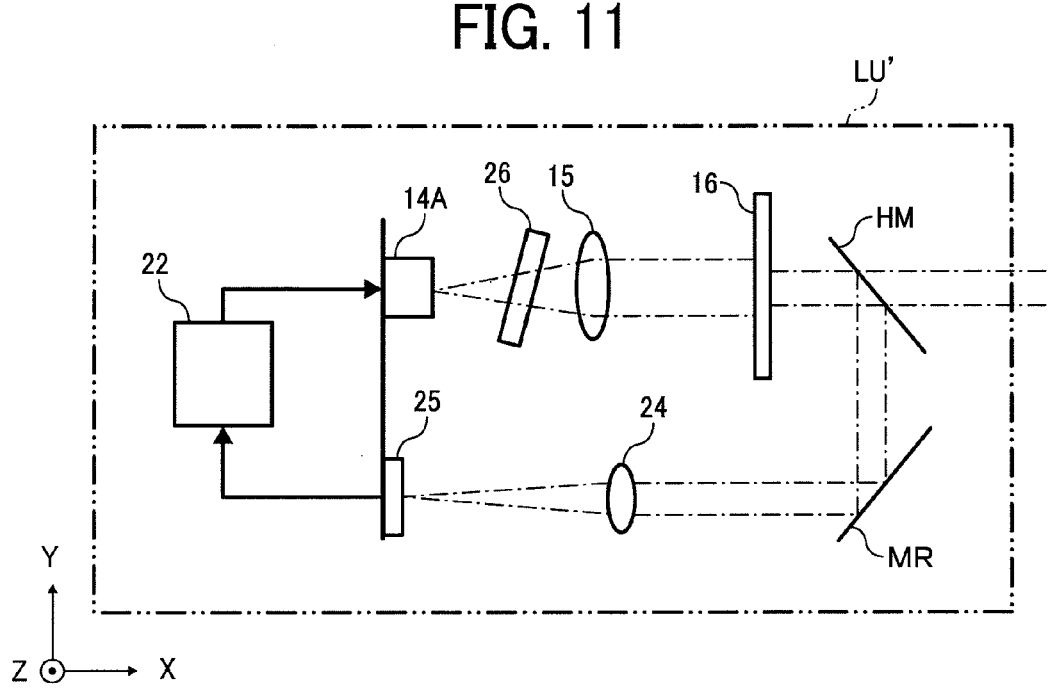
FIG. 11 is a schematic diagram of a light-source unit shown in FIG. 10.

As shown in FIG. 11, the light-source unit LU' includes a light source 14A, a coupling lens 15, an aperture plate 16, a half mirror HM, a reflecting mirror MR, a light-source driving unit 22, a focusing lens 24, a photoreceiver 25, and an isolator 26.

Figure 12:
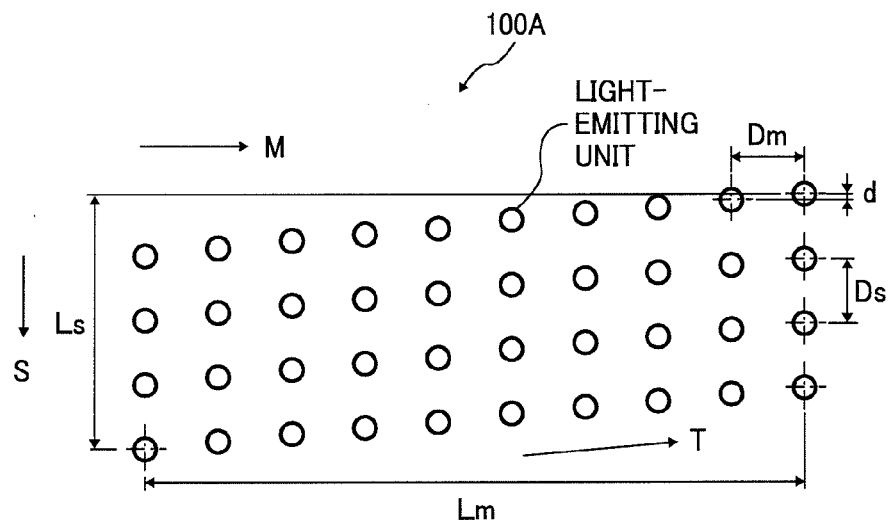
FIG. 12 is a schematic diagram of a surface-emitting laser array of a light source shown in FIG. 11.

As shown in FIG. 12, the light source 14A includes a laser array 100A having, for example, 40 light-emitting units arranged in a two-dimensional array on a substrate.

In the second embodiment, d=5.0 micrometers, Dm=30 micrometers, Ds=25 micrometers, Lm=Dm×9=270 micrometers, and Ls=d×39=194 micrometers, as shown in FIG. 12, where d is the spacing between adjacent light-emitting units when all the light-emitting units are orthogonally projected onto an imaginary line extending in the direction S, Dm is the spacing between adjacent light-emitting units in the direction M, Ds is the spacing between rows of the light-emitting units in the direction S, Lm is the spacing between the light-emitting units at both ends in the direction M, and Ls is the spacing between the light-emitting units at both ends in the direction S.

Each of the light-emitting units is a vertical-cavity surface-emitting laser (VCSEL) with an oscillation wavelength in a wavelength band of 780 nanometers. A light beam is emitted in the +X direction from each of the light-emitting units. In the design, the light beam emitted from each of the light-emitting units is assumed to be linearly polarized light (p-polarized light in the present embodiment).

The isolator 26 is held in the holding unit 126 described above and is arranged at the +X side of the light source 14A.

Because the VCSEL does not emit a light beam backward (the −X direction in the present embodiment), the light-source unit LU' is constructed by adding the half mirror HM, the reflecting mirror MR, and the focusing lens 24 to the light-source unit LU.

The half mirror HM is arranged at the +X side of the aperture plate 16 and splits off, in the −Y direction, a part of the light beam that has passed through the aperture portion of the aperture plate 16. Thereafter, the light beam that has passed through the half mirror HM is output from the light-source unit LU'.

The reflecting mirror MR is arranged at the −Y side of the half mirror HM and deflects the optical path of the light beam branched by the half mirror HM in the −X direction.

The focusing lens 24 is arranged at the −X side of the reflecting mirror MR and focuses the light beam reflected at the reflecting mirror MR. The photoreceiver 25 is arranged near the focal point of the light beam that has passed through the focusing lens 24.

Because the VCSEL does not emit a light beam backward (the −X direction in the embodiment) due to the nature of its structure, a light control is performed in a different manner from that employed by the edge-emitting semiconductor laser. For example, a part of the light beam emitted from the light source may be split by the half mirror, and the branched light beam may be made to enter the light-receiving element for detecting the optical intensity of the light beam.

The half mirror has different reflectances and transmittances depending on the polarization state of the incident light. It is known that the polarization direction of the light beam emitted from a VCSEL changes due to a change in the environmental temperature or heat generated by the laser itself. In addition, because a plurality of light-emitting units (VCSELs) experience different temperatures from one another, the individual light-emitting units may also have different polarization directions.

In the conventional technology, therefore, when the polarization direction of a light beam emitted from the light source changes, the reflectance and the transmittance of the half mirror change, thereby bringing about a change in the ratio between the optical intensity of the light beam reaching the surface to be scanned and the optical intensity of the light beam detected by the light-receiving element. In this case, the optical intensity of the light beam emitted from the light source is subjected to variation even with the APC, possibly causing a nonuniform density in the output image.

On the other hand, according to the second embodiment, because the polarization direction of the light beam that has passed through the isolator is always constant, the ratio between the optical intensity of the light beam reaching the photosensitive drum 1030 and the optical intensity of the light beam detected by the photoreceiver 25 can be kept constant, despite a change in the polarization direction of the light beam emitted from the light source. In short, an accurate optical intensity of the light beam can be detected, thereby suppressing the nonuniform density in the output image.

Figure 13:
FIG. 13 is a set of graphs for explaining the effect of a return light.

According to the first embodiment, a plurality of light-emitting units (edge-emitting semiconductor lasers) are arranged in a one-dimensional array at about 30-micrometer intervals. According to the second embodiment, on the other hand, a plurality of light-emitting units (VCSELs) are arranged in a two-dimensional array within a region of about 300 micrometers by about 200 micrometers. The VCSELs arranged two-dimensionally in this manner have a large light-emitting area, and therefore, there is high possibility that return light will be incident on the light-emitting area, compared with the edge-emitting semiconductor lasers arranged one-dimensionally. If return light enters the light source, the output becomes unstable (see FIG. 13).

Whereas the maximum output intensity of the edge-emitting semiconductor lasers is about 12 milliwatts, the maximum output intensity of the VCSELs is about 1.4 milliwatts. In other words, the VCSELs have a maximum output intensity that is smaller than that of the edge-emitting semiconductor lasers by about one order of magnitude. For this reason, if a VCSEL is to be used, the light utilization efficiency is an important consideration. According to the second embodiment, because the isolator includes a rotation mechanism, the light utilization efficiency can be enhanced beyond that achievable heretofore.

As described above, although the optical scanning device 1010A according to the second embodiment differs from the optical scanning device 1010 according to the first embodiment in the type and the number of light-emitting units, the optical scanning device 1010A can afford the same advantages as those of the optical scanning device 1010 because the other basic structures are common between the optical scanning devices 1010A and 1010.

As a result, a laser printer including the optical scanning device 1010A can afford the same advantages as those of the laser printer 1000.

Although the second embodiment has been described assuming that the laser array 100A includes forty light-emitting units, the number of light-emitting units is not limited to any particular number.

Figure 14:
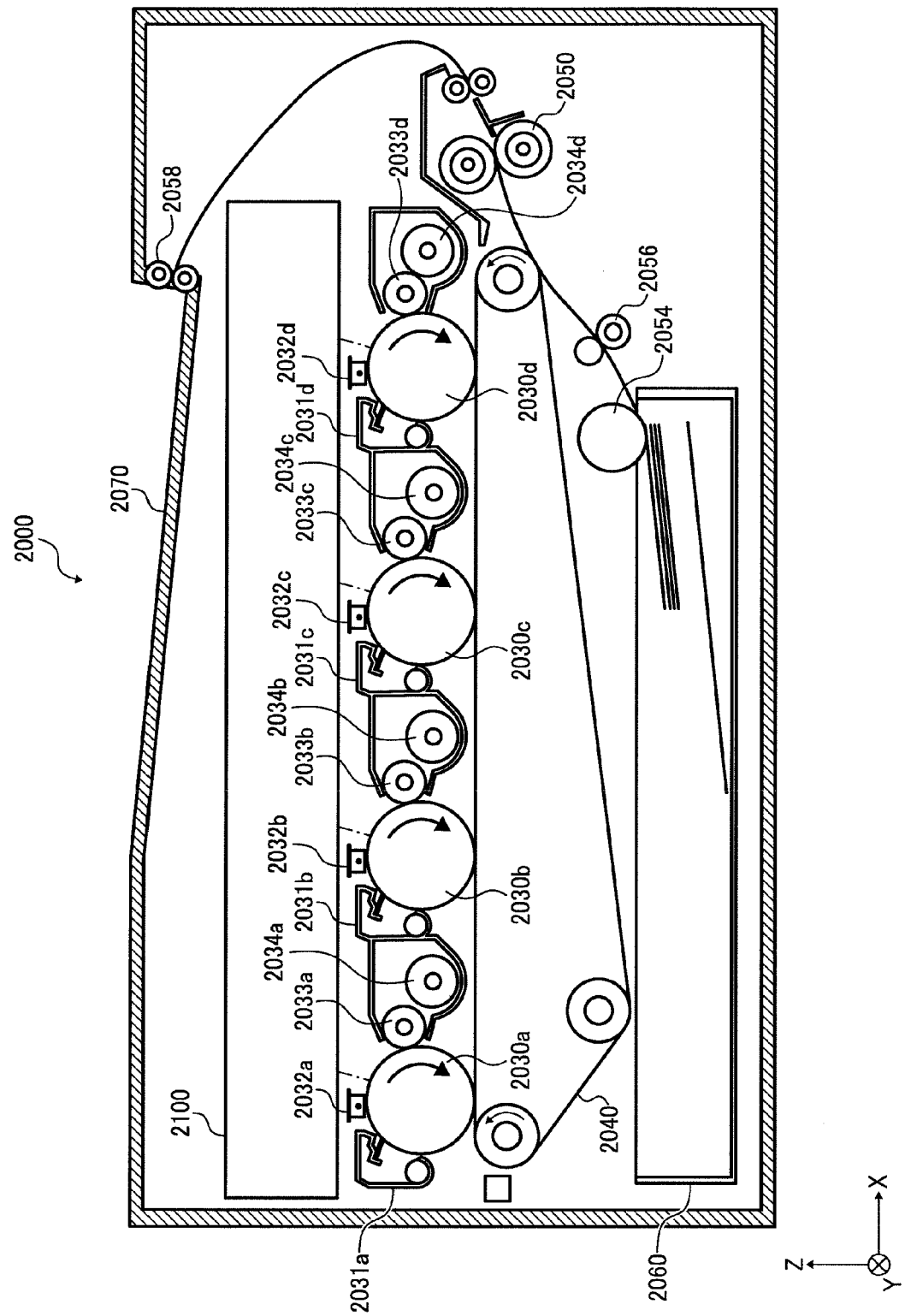
FIG. 14 is a schematic diagram of a color printer as an image forming apparatus according to a third embodiment of the present invention.

A third embodiment according to the present invention will now be described with reference to FIGS. 14 to 16, 17A, 17B, 18A, 18B, 19, and 20. FIG. 14 is a schematic diagram of an exemplary structure of a color printer 2000, serving as an image forming apparatus according to the third embodiment.

The color printer 2000 is a tandem-type color printer that forms a full-color image by combining four colors (black, cyan, magenta, and yellow). The color printer 2000 includes an optical scanning device 2100, four photosensitive drums (2030a, 2030b, 2030c, and 2030d), four charging units (2032a, 2032b, 2032c, and 2032d), four developing rollers (2033a, 2033b, 2033c, and 2033d), four toner cartridges (2034a, 2034b, 2034c, and 2034d), four cleaning units (2031a, 2031b, 2031c, and 2031d), a transfer belt 2040, a feed tray 2060, a feed roller 2054, a pair of registration rollers 2056, a fixing roller 2050, a discharge tray 2070, a discharge roller 2058, a printer control unit (not shown in the figure) that comprehensively controls these components, and so forth.

The photosensitive drum 2030a, the charging unit 2032a, the developing roller 2033a, the toner cartridge 2034a, and the cleaning unit 2031a are used as a set and constitute an image-forming station that forms a black image.

The photosensitive drum 2030b, the charging unit 2032b, the developing roller 2033b, the toner cartridge 2034b, and the cleaning unit 2031b are used as a set and constitute an image-forming station that forms a cyan image.

The photosensitive drum 2030c, the charging unit 2032c, the developing roller 2033c, the toner cartridge 2034c, and the cleaning unit 2031c are used as a set and constitute an image-forming station that forms a magenta image.

The photosensitive drum 2030d, the charging unit 2032d, the developing roller 2033d, the toner cartridge 2034d, and the cleaning unit 2031d are used as a set and constitute an image-forming station that forms a yellow image.

Each of the photosensitive drums has a photosensitive layer formed on the surface thereof. In short, the surface of each of the photosensitive drums serves as a surface to be scanned. The longitudinal direction of the photosensitive drums corresponds to the Y-axis direction, and the photosensitive drums are arranged at regular intervals in the X-axis direction. The photosensitive drums rotate in the directions indicated by the arrows in the drawing of FIG. 14 with a rotation mechanism (not shown in the figure).

Each of the charging units uniformly charges the surface of the corresponding photosensitive drum.

The optical scanning device 2100 irradiates the surface of each charged photosensitive drum with a light beam modulated for the corresponding color based on multi-color image information (black image information, cyan image information, magenta image information, and yellow image information) received from the upper-level device. By doing so, on the surface of each of the photosensitive drums, only the areas irradiated with light are neutralized, and a latent image corresponding to image information is formed on the surface of each of the photosensitive drums. The formed latent image moves towards the corresponding developing roller along with the rotation of the photosensitive drum. The structure of the optical scanning device 2100 will be described later.

The toner cartridge 2034a stores black toner, which is supplied to the developing roller 2033a. The toner cartridge 2034b stores cyan toner, which is supplied to the developing roller 2033b. The toner cartridge 2034c stores magenta toner, which is supplied to the developing roller 2033c. The toner cartridge 2034d stores yellow toner, which is supplied to the developing roller 2033d.

Along with the rotation of each developing roller, the toner from the corresponding toner cartridge is applied to the surface of the developing roller in a thin, uniform manner. When the toner on the surface of each developing roller comes in contact with the surface of the corresponding photosensitive drum, the toner is transferred only to the areas on the surface irradiated with light and adheres to those areas. In other words, each of the developing rollers visualizes an image by depositing toner onto the latent image formed on the surface of the corresponding photosensitive drum. The image visualized as a result of toner being deposited thereonto (the toner image) moves towards the transfer belt 2040 along with the rotation of the photosensitive drum.

The black, cyan, magenta, and yellow toner images are sequentially transferred onto the transfer belt 2040 with a predetermined timing and overlaid with one another to form a color image.

The feed tray 2060 stores recording sheets. Near this feed tray 2060 is the feed roller 2054, which takes the recording sheets out of the feed tray 2060 one at a time and transports the sheet to the registration rollers 2056. The registration rollers 2056 sends the recording sheet towards the transfer belt 2040 with a predetermined timing. As a result, the color image on the transfer belt 2040 is transferred onto the recording sheet. The recording sheet onto which the image has been transferred is sent to the fixing roller 2050.

In the fixing roller 2050, heat and pressure are applied to the recording sheet, thereby fixing toner onto the recording sheet. Recording sheets on which toner has been fixed in this manner are sent to the discharge tray 2070 via the discharge roller 2058 and are sequentially stacked on the discharge tray 2070.

Each of the cleaning units removes any toner remaining on the surface of the corresponding photosensitive drum (residual toner). The surface of the photosensitive drum from which the residual toner has been removed returns to the position facing the corresponding charging unit.

The structure of the optical scanning device 2100 will now be described.

Figure 15:
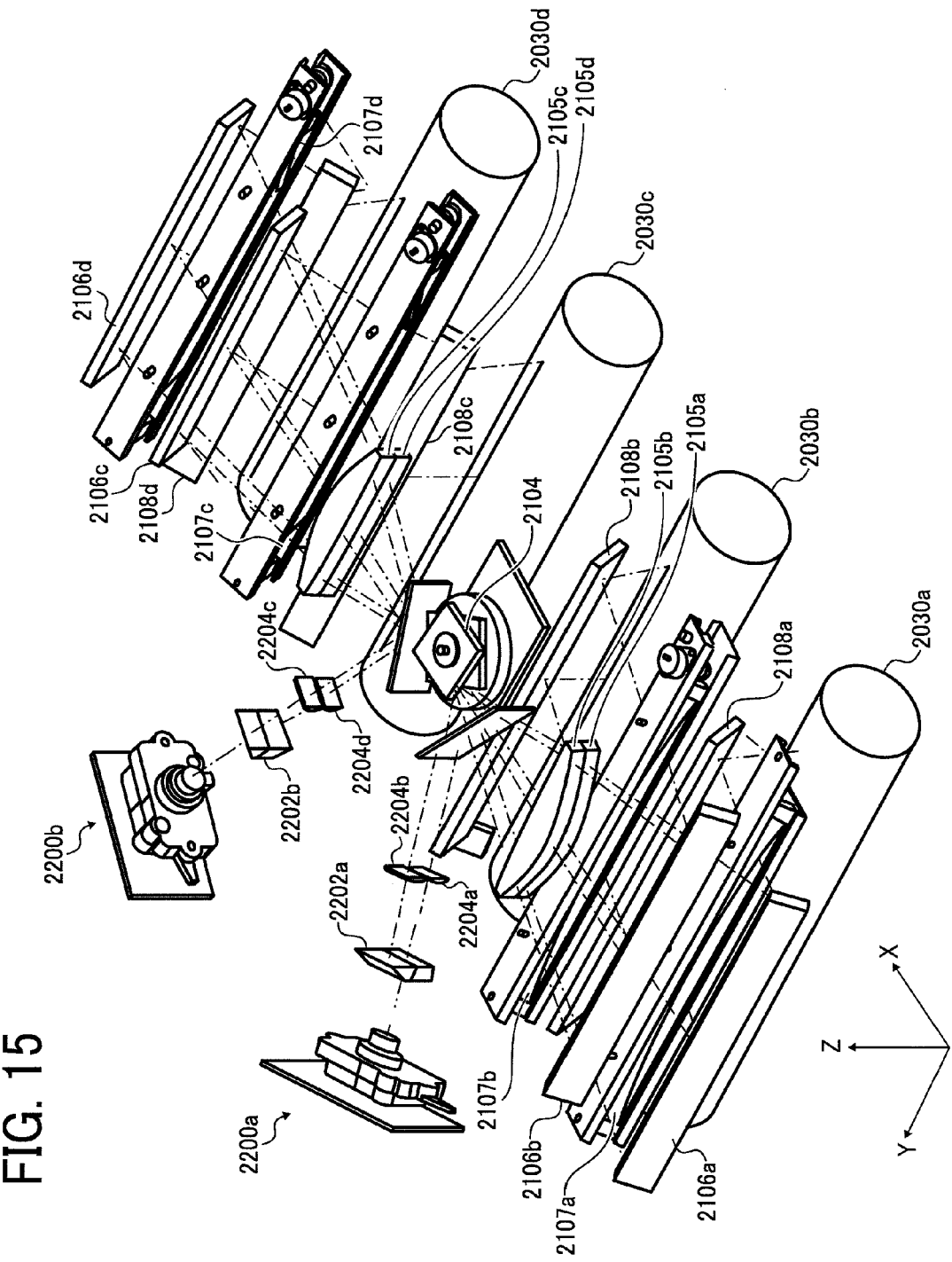
FIG. 15 is a perspective view of an optical scanning device shown in FIG. 14.

Referring to FIG. 15, the optical scanning device 2100 includes two light-source units (2200a and 2200b), two beam-splitting prisms (2202a and 2202b), four cylindrical lenses (2204a, 2204b, 2204c, and 2204d), a polygon mirror 2104, four fθ lenses (2105a, 2105b, 2105c, and 2105d), eight reflecting mirrors (2106a, 2106b, 2106c, 2106d, 2108a, 2108b, 2108c, and 2108d), four toroidal lenses (2107a, 2107b, 2107c, and 2107d), and so forth.

Each of the light-source units is realized by a light-source unit similar to the light-source unit LU' according to the second embodiment.

Figure 16:
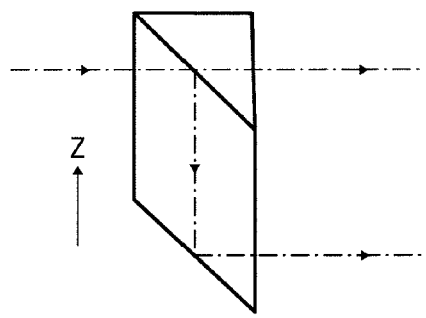
FIG. 16 is a schematic diagram of a beam-splitting prism shown in FIG. 15.

Referring to FIG. 16, each of the light beam-splitting prisms includes, for example, a half mirror surface that transmits one half of an incident light beam and reflects the other half; and a mirror surface that is arranged parallel to the half mirror surface and on the optical path of the light beam reflected at the half mirror surface. In short, each of the light beam-splitting prisms divides an incident light beam into two beams parallel to each other.

In the embodiment, the light beam from the light-source unit 2200a enters the light beam-splitting prism 2202a, and the light beam from the light-source unit 2200b enters the light beam-splitting prism 2202b.

Referring back to FIG. 15, the cylindrical lens 2204a is arranged on the optical path of the −Z side beam of the two beams from the light beam-splitting prism 2202a, and the cylindrical lens 2204b is arranged on the optical path of the +Z side beam of the two beams from the light beam-splitting prism 2202a. The cylindrical lens 2204c is arranged on the optical path of the +Z side beam of the two beams from the light beam-splitting prism 2202b, and the cylindrical lens 2204d is arranged on the optical path of the −Z side beam of the two beams from the light beam-splitting prism 2202b.

Each of the cylindrical lenses converges the incident light beam at a point near the deflecting reflection surfaces of the polygon mirror 2104 in the direction corresponding to the sub-scanning (the Z-axis direction in the embodiment).

Figure 17A:
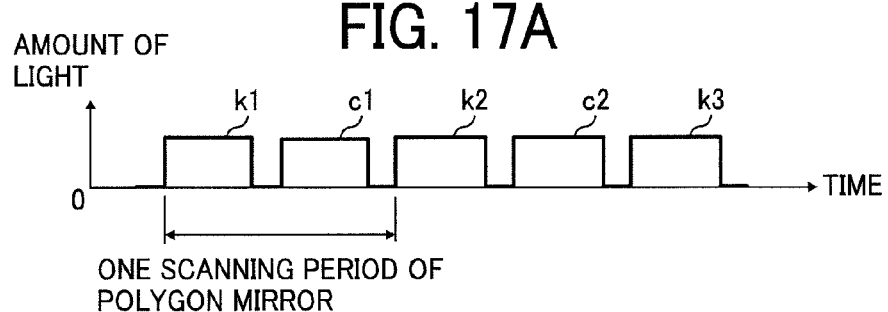
FIGS. 17A and 17B are graphs for explaining a temporal change of a write optical intensity.
Figure 17B:
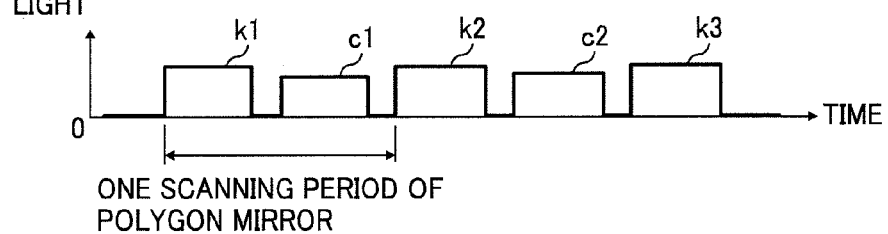

The polygon mirror 2104 has two-stage tetrahedral mirrors, and each of the mirrors serves as a deflecting reflection surface. The polygon mirror 2104 is arranged such that the light beam from the cylindrical lens 2204a and the light beam from the cylindrical lens 2204d are deflected on the first-stage (lower-stage) deflecting reflection surface and the light beam from the cylindrical lens 2204b and the light beam from the cylindrical lens 2204c are deflected on the second-stage (upper-stage) deflecting reflection surface. The first-stage deflecting reflection surface and the second-stage deflecting reflection surface rotate with the phases shifted by 45° from each other, and writing scanning is performed alternatively between the first stage and the second stage (see FIGS. 17A and 17B). FIG. 17A is a graph showing a case where the light power at the time of writing black image information (k1, k2, and k3) is equal to the light power at the time of writing cyan image information (c1 and c2). FIG. 17B is a graph showing a case where these power values are different from each other.

Figure 18A:
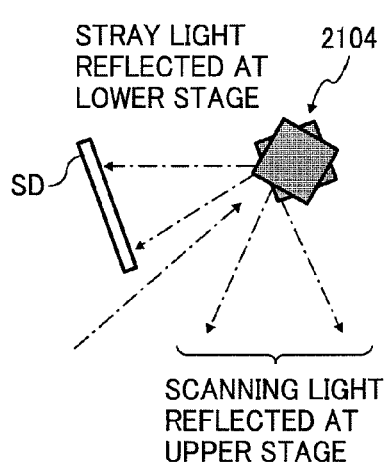
FIGS. 18A and 18B are schematic diagrams of a light-shielding plate.
Figure 18B:
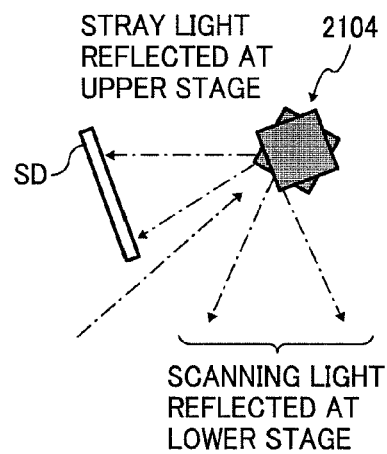

A light-shielding plate SD is provided near the polygon mirror 2104 to prevent the light beam deflected at the first-stage deflecting reflection surface from adversely affecting the light beam deflected at the second-stage deflecting reflection surface when writing is performed with the light beam deflected at the second-stage deflecting reflection surface, as shown in FIG. 18A, and to prevent the light beam deflected at the second-stage deflecting reflection surface from adversely affecting the light beam deflected at the first-stage deflecting reflection surface when writing is performed with the light beam deflected at the first-stage deflecting reflection surface, as shown in FIG. 18B.

The fθ lens 2105a and the fθ lens 2105b are arranged at the −X side of the polygon mirror 2104, and the fθ lens 2105c and the fθ lens 2105d are arranged at the +X side of the polygon mirror 2104.

The fθ lens 2105a and the fθ lens 2105b are stacked one on another in the Z-axis direction. The fθ lens 2105a faces the first-stage deflecting reflection surface, and the fθ lens 2105b faces the second-stage deflecting reflection surface. The fθ lens 2105c and the fθ lens 2105d are stacked one on another in the Z-axis direction. The fθ lens 2105c faces the second-stage deflecting reflection surface, and the fθ lens 2105d faces the first-stage deflecting reflection surface.

Figure 19:
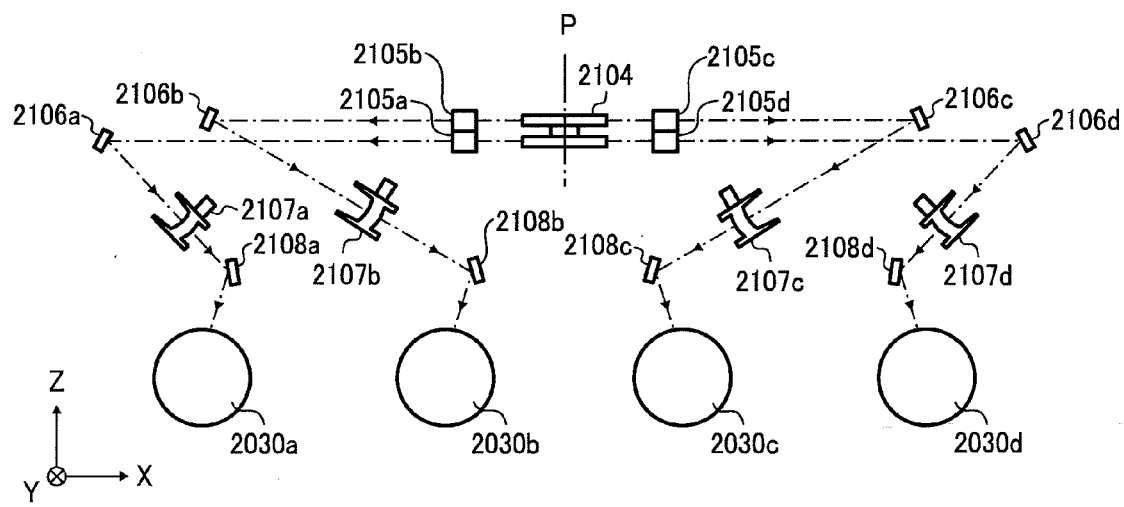
FIG. 19 is a side view of the optical scanning device shown in FIG. 14.

The light beam from the cylindrical lens 2204a that has been deflected by the polygon mirror 2104 is emitted to the photosensitive drum 2030a via the fθ lens 2105a, the reflecting mirror 2106a, the toroidal lens 2107a, and the reflecting mirror 2108a (see FIG. 19).

Furthermore, the light beam from the cylindrical lens 2204b that has been deflected by the polygon mirror 2104 is emitted to the photosensitive drum 2030b via the fθ lens 2105b, the reflecting mirror 2106b, the toroidal lens 2107b, and the reflecting mirror 2108b (see FIG. 19).

In addition, the light beam from the cylindrical lens 2204c that has been deflected by the polygon mirror 2104 is emitted to the photosensitive drum 2030c via the fθ lens 2105c, the reflecting mirror 2106c, the toroidal lens 2107c, and the reflecting mirror 2108c (see FIG. 19).

Furthermore, the light beam from the cylindrical lens 2204d that has been deflected by the polygon mirror 2104 is emitted to the photosensitive drum 2030d via the fθ lens 2105d, the reflecting mirror 2106d, the toroidal lens 2107d, and the reflecting mirror 2108d (see FIG. 19).

The reflecting mirrors are arranged such that the lengths of the optical paths from the polygon mirror 2104 to the photosensitive drums coincide with one another and the incident positions and the incident angles of the light beams at the photosensitive drums are identical with one another.

Figure 20:
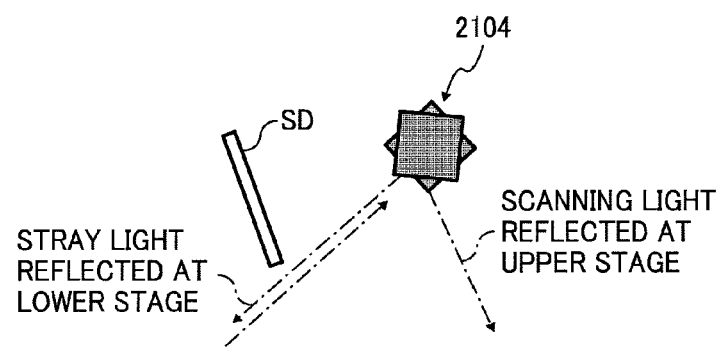
FIG. 20 is a schematic diagram for explaining a stray light incident on a cylindrical lens.

As described above, each of the light-source units in the optical scanning device 2100 according to the third embodiment is realized by a light-source unit similar to the light-source unit LU' according to the second embodiment. Therefore, for example, even if the light beam reflected at the polygon mirror 2104 enters a cylindrical lens, stray light can be prevented from returning to the light source, as shown in FIG. 20. In short, the optical scanning device 2100 according to the third embodiment can afford advantages similar to those of the optical scanning device 1010.

Furthermore, because the color printer 2000 according to the third embodiment includes the optical scanning device 2100, it can afford advantages similar to those of the laser printer 1000.

In the third embodiment, a light-source unit may be provided for each color.

In addition, although each of the embodiments has been described assuming that the image forming apparatus is a printer, the image forming apparatus is not limited to a printer. For example, an image forming apparatus other than a printer (e.g., a copier, a facsimile, or a multi-function peripheral including copier and facsimile functions) can also form a high-quality image at high speed without increasing costs, as long as the image forming apparatus includes an optical scanning device according to the present invention.

Furthermore, an image forming apparatus in which the image bearing member is realized by a color-forming agent (positive printing paper) that develops color by the thermal energy at a beam spot is also acceptable. In this case, a visual image can be formed directly on the image bearing member by optical scanning.

According to one aspect of the present invention, even though the light-emitting units of the light source show some variation in polarization state, adjustment can be performed so that the light transmittance of a light beam from the light source is maximized by rotating the isolator. As a result, the surface to be scanned can be irradiated with a light beam from the light source while suppressing the loss of the optical intensity of the light beam. In addition, even if a light beam that has been emitted from the light source and reflected, for example, at a deflector returns to the pre-deflector optical system, most of the return beam can be blocked by the first surface because the emitted beam and the return beam differ in polarization state on the first surface. As a result, high-accuracy optical scanning can be performed without increasing costs or decreasing the light utilization efficiency.

Furthermore, according to another aspect of the present invention, because at least one optical scanning device according to the present invention is provided, a high-quality image can be formed at high speed without incurring high costs.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device that scans at least one scanning surface with a light beam, the optical scanning device comprising:
    a light source having a plurality of light-emitting units;
    a pre-deflector optical system including an isolator that is arranged on an optical path of a light beam from the light source, the isolator having a first surface with different light transmittances depending on a polarization state of an incident light beam on its first side close to the light source and a second surface imparting an optical phase difference of a quarter wavelength to the incident light beam on its second side opposite to the first side along the optical path;

a photoreceiver;

a half mirror for splitting the light beam into first and second split beams, and for transmitting the second split beam toward the photoreceiver;

a deflector that deflects the first split beam;

a rotation mechanism that rotates the isolator around an optical axis of the isolator; and a holding member that holds the light source and the isolator in a predetermined positional relationship; and wherein the photoreceiver is configured to detect an optical intensity of the second split beam; and the isolator is located between the light source and the half mirror on the optical path of the light beam from the light source.

2. The optical scanning device according to claim 1, wherein the isolator is accommodated in a cylindrical cell and is rotated by the rotation mechanism via the cell.

3. The optical scanning device according to claim 1, wherein an incidence plane of the isolator on which the light beam from the light source is incident is tilted with respect to an imaginary plane perpendicular to a principal ray direction of the light beam from the light source.

4. The optical scanning device according to claim 1, wherein the pre-deflector optical system further includes an aperture plate that has an aperture portion and that shapes an incident light beam, a length in one direction of the aperture portion being larger than a length in another direction of the aperture portion, the isolator has an effective area, a length in one direction of the effective area being larger than a length in another direction of the effective area, and a longitudinal direction of the effective area is identical to a longitudinal direction of the aperture portion.

5. The optical scanning device according to claim 1, wherein the pre-deflector optical system includes a coupling lens that substantially collimates an incident light beam, the holding member further holds the coupling lens in a predetermined positional relationship relative to the light source and the isolator, and the isolator is arranged between the light source and the coupling lens.

6. The optical scanning device according to claim 5, wherein the light-emitting units are vertical-cavity surface-emitting lasers, and the light-emitting units are arranged in a two-dimensional array.

7. The optical scanning device according to claim 6, wherein the pre-deflector optical system includes a coupling lens that substantially collimates an incident light beam, the holding member further holds the coupling lens in a predetermined positional relationship relative to the light source and the isolator, and the isolator is arranged between the light source and the coupling lens.

8. The optical scanning device according to claim 7, wherein the light source, the isolator, the coupling lens, and the photodetector integrally form a light-source unit.

9. The optical scanning device according to claim 6, wherein the pre-deflector optical system further includes an aperture plate that has an aperture portion and that shapes an incident light beam, a length in one direction of the aperture portion being larger than a length in another direction of the aperture portion, the isolator has an effective area, a length in one direction of the effective area being larger than a length in another direction of the effective area, and a longitudinal direction of the effective area is identical to a longitudinal direction of the aperture portion.

10. The optical scanning device according to claim 9, wherein the half mirror is arranged between the aperture portion and the deflector.

11. The optical scanning device according to claim 1, wherein the at least one surface includes a plurality of scanning surfaces, and the optical scanning device further comprises a splitting optical system that divides the light beam from the light source into a plurality of light beams for respective scanning surfaces.

12. An image forming apparatus comprising: at least one image carrier; and the optical scanning device of claim 1, the optical scanning device being configured to scan the at least one image carrier with a light beam modulated by image information; and wherein the isolator is accommodated in a cylindrical cell and is rotated by the rotation mechanism via the cell; and the pre-deflector optical system includes a coupling lens that substantially collimates an incident light beam, the holding member further holds the coupling lens in a predetermined positional relationship relative to the light source and the isolator, and the isolator is arranged between the light source and the coupling lens.

13. The image forming apparatus according to claim 12, wherein the image information is color image information including multiple colors.

* * * * *